United States Patent [19]
Daniel

[11] 3,841,163
[45] Oct. 15, 1974

[54] TEST DUMMY SUBMARINING INDICATOR SYSTEM

[75] Inventor: Roger P. Daniel, Dearborn, Mich.

[73] Assignee: Ford Motor Company, Dearborn, Mich.

[22] Filed: June 8, 1973

[21] Appl. No.: 368,400

[52] U.S. Cl. .................. 73/432 SD, 73/172, 73/12, 35/17
[51] Int. Cl. ...................... G01f 15/06, G01b 9/00
[58] Field of Search ....... 73/432 SD, 172, 12; 35/17

[56] References Cited
UNITED STATES PATENTS
3,740,871   6/1972   Berton et al. .......................... 35/17

Primary Examiner—James J. Gill
Assistant Examiner—Anthony V. Ciarlante
Attorney, Agent, or Firm—Joseph W. Malleck; Keith L. Zerschling

[57] ABSTRACT

A test apparatus for indicating the degree of submarining of an anthropomorphic dummy under deceleration. A plurality of strain gauges are embedded in a predetermined pattern in each of a pair of iliac-contoured surfaces located on the dummy. The existence or nonexistence of a sensor read-out and its shape, is effective to indicate either or both a skewed or submarining position of said dummy.

7 Claims, 9 Drawing Figures

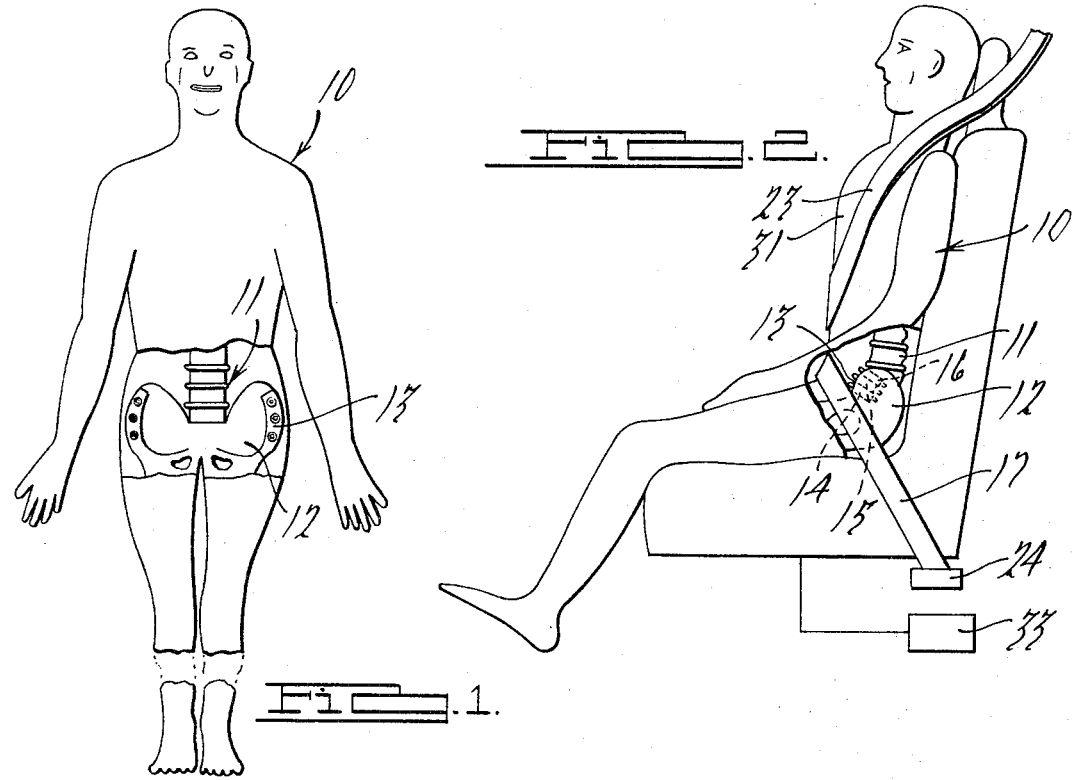
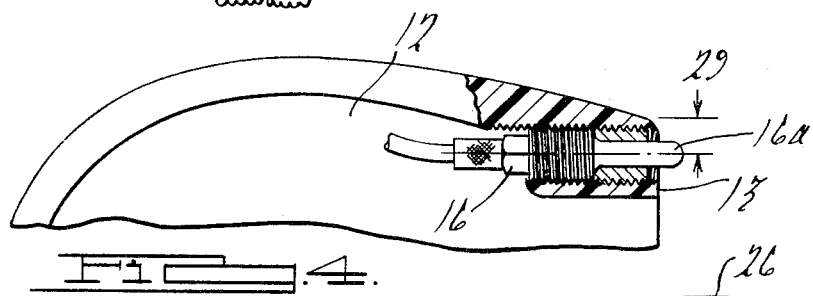
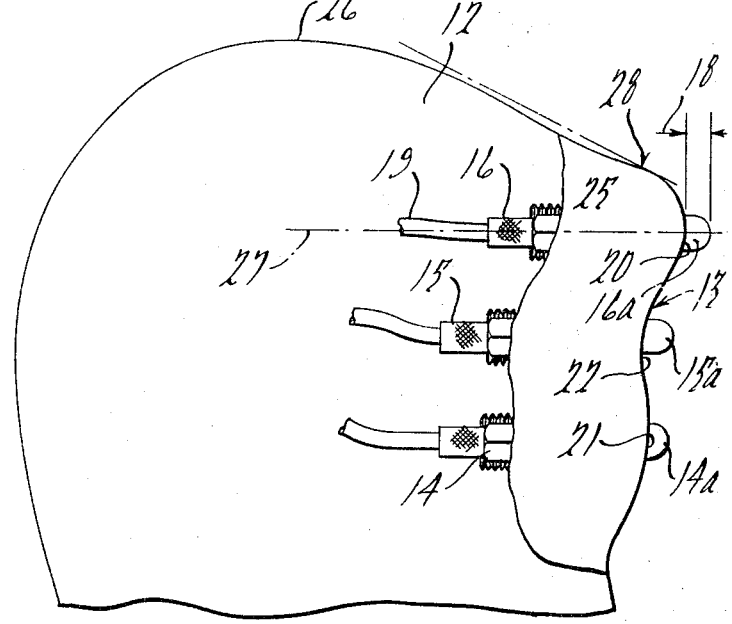

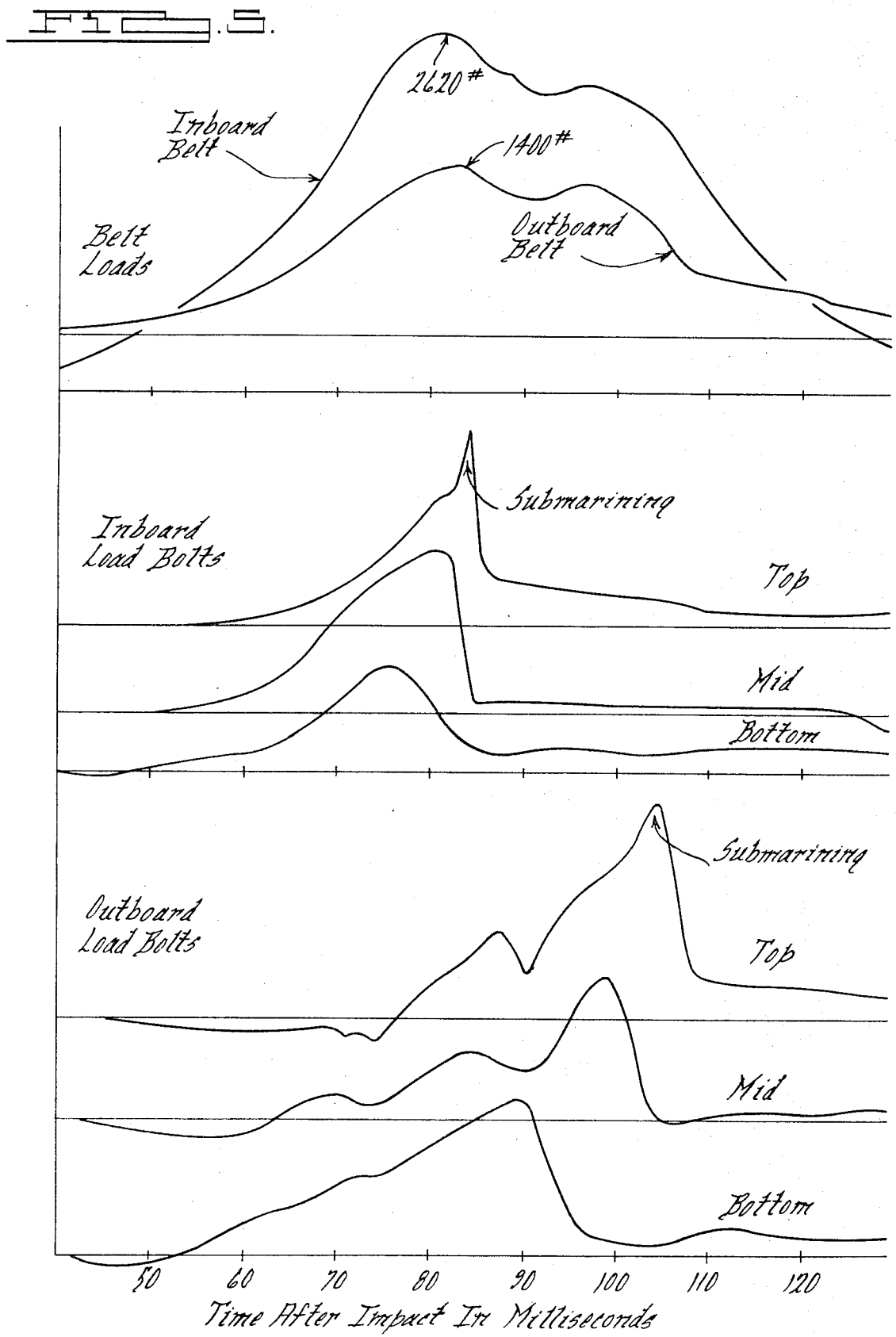

TEST DUMMY SUBMARINING INDICATOR SYSTEM

BACKGROUND OF THE INVENTION

Much development is being undertaken to quantify and determine the various dynamic effects of crashes, particularly on the human occupants of an automobile. This requires sensitive testing apparatus which will communicate various physical conditions and forces. Heretofor, it has not been possible to positively determine at what precise point and degree submarining has taken place with respect to an anthropomorphic dummy under a crash test. Much speculation has surrounded the dummy's position under various crash conditions. Submarining is used herein to mean the amount of movement of the dummy relative to the belt in a direction sideways or under the loop of the belt (as it is normally formed to surround the midsection of the dummy). Normally, the lap belt should not shift with appreciable degree relative to the surface of the dummy if properly maintained under pressure against the iliac-contoured bone structure of a human form. The illiac-contoured surface has a pair of peaks separated by a valley therebetween, the highest peak providing a crest over which it has been hoped that the seat belt would not surmount. However, it has been experienced during severe crashes that the body loosens from the restraining pressure of the belt when the contacting portion of the belt goes beyond the pelvic crest; it then engages the soft abdominal area of the human form. When such movement has taken place, complete submarining is accomplished.

SUMMARY OF THE INVENTION

The primary object of this invention is to provide a mechanical apparatus that is capable of detecting side slippage of a safety belt relative to an anthropomorphic dummy useful in safety vehicle tests under crash conditions.

It is another object of this invention to provide an apparatus that will detect side slippage (submarining) and to do so in a manner that is accurate, foolproof, and consistently reliable.

Structural features pursuant to the above objects is the provision of a pattern of sensing points on a surface contoured to resemble the iliac of the human form; the illiac surface has an inherent curvature effective to normally saddle the safety belt for relative non-slippage positioning. In the event the saddle effect is overcome during a crash, the sensors can indicate the progress of such slippage, as well as any skewing of the dummy.

DESCRIPTION OF THE DRAWINGS

FIG. 1 is a front elevational view of an anthropomorphic dummy embodying the principles of this invention;

FIG. 2 is a side elevational view of the structure in FIG. 1 as seated and strapped in a vehicle;

FIG. 3 is a view of an iliac-contoured dummy surface and showing the embedded sensors;

FIG. 4 is an enlarged view of the structure in FIG. 3 showing one of the sensors in section;

FIGS. 5–9 represent graphical illustrations of the variance of sensed strain (resulting from the belt) with respect to time; different degrees of tauntness, with or without shoulder harness, were employed in the tests for the various illustrations.

DETAILED DESCRIPTION

Figure 6:
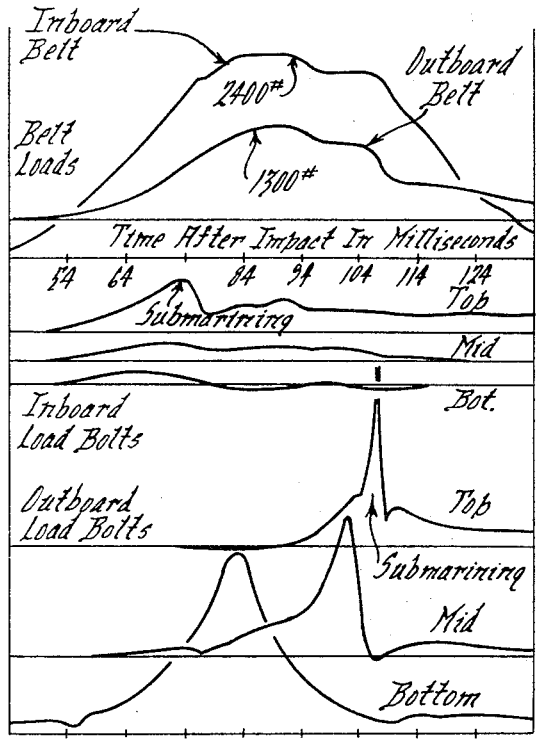

At the inception of this invention, it was postulated that the shapes of the load vs. time curves of a series of load bolts or sensors mounted in a vertical row on each ilium-contoured surface of the anthropomorphic dummy's pelvis (FIG. 1), would indicate submarining. When the load measured by any load bolt fell off abruptly, it would indicate that the safety lap belt had risen on the ilium-contoured surface, past the point where the load bolt was located. Thus, both actual submarining and the time-sequence of the upward bolt movement relative to the pelvis could be measured. This latter measurement permits indication of the tendency to submarine because it shows how far up (or away) the belt has climbed as a function of time.

A preferred embodiment of this concept is shown in FIGS. 2–4 wherein a typical anthropomorphic dummy 10 (typically the Alderson VIP-50A type) is provided with a molded bone structure 11 having a simulated pelvis 12 provided with a iliac-contoured surface 13. A minimum of three generally aligned sensors 14, 15 and 16, in the form of strain load measuring bolts, were inserted (preferably threadably inserted) in the pelvis with the outermost portion or pressure sensing head 14a, 15a and 16a, protruding above the surface 13. At least three of these bolts were placed in each iliac frontal contour on opposed sides of the dummy. The bolt sensitivity to the loading of a lap belt 17 is adjusted by turning the bolt in or out, thus increasing or decreasing the bolt projection 18 beyond the edge of the ilium. For purposes of initial testing, the load bolts were connected by leads 19 to a straingage set up only as a quarter bridge due to the small size of the bolt. The bridge was completely external (not shown). However, the straingage bolt may have a full bridge for more accurate sensing. The sensor used in the embodiment was a basic Strainsert SJ series, type "C" load sensor modified in aluminum alloy 7075-76. Means 33, shown schematically, represents a mechanism for accelerating and decelerating the dummy to simulate crash conditions.

Dummy submarining and the tendency to submarine can be accurately measured electrically by said two rows of three load bolts placed vertically on the contoured edge or surface 13 of the ilium, where the lap belt 17 makes solid contact with the pelvis. Note the contour of the iliac form; it has a generally high peak 20, and lower, more recessed portions below the peak or crest. The lap belt normally rests on this surface below the crest during a normal tightened condition. The longitudinal axis 27 of the sensor 16 is at an angle 25 of about 12°–14° with the upper contour 26 of the iliac. The top sensor 16 is spaced at 29 about 0.25–0.35 inches from the corner 28. During a crash, the lap belt is sometimes caused to move upward in relation to the pelvis as a result of the dummy submarining or moving under the belt. Contact is broken first with the bottom load bolt head 14a, then the center head 15a and finally with the top bolt head 16a. When the latter has occurred, it is an indication the belt 17 has slipped off the pelvis and into the soft abdominal area of the human form. The rapid fall off of load, and load bolt identity, when belt contact is broken, clearly indicates the time as well as the time sequence of lap belt movement upwardly on the pelvis.

Turning now to the graphical illustrations (FIGS. 5–9), there is shown the results of five crash tests run at 31 m.p.h. on a Hyge type sled). The bottom series of traces represent individual signals from the outboard (door side) load bolts and the middle series of traces represent individual signals for the inboard load bolts. The uppermost series of traces represent the actual lap belt loads. The lap belt 17 was initially (test I, see FIG. 6) positioned with approximately a 2 inch looseness or space between the belt and the dummy 10, however, the shoulder harness 23 was pulled snug in an attempt to induce submarining, which did in fact occur at both ilium surfaces. The lap belt was anchored at locations 24 typical of a 1973 Ford installation with belt making an angle with the horizontal no greater than 60°. The harness 23 pulled the belt 17 up sufficiently on the inboard side that only the top load bolt experienced any belt loading. Submarining occurred at 74 ms as indicated by the rapid drop-off in the load on the top bolt 16 (the load after the sharp fall-off is a result of the skin being stretched taut over the load bolts). The progression of the belt 17 upward movement is clearly revealed by the outboard bolt load traces. The belt moves past the bottom bolt 14 at about 83 ms, past the center bolt 15 at about 101 ms, and finally snaps off the illium at about 107 ms, allowing complete submarining at both iliums. Note the dip in the outboard bolt curve at 107 ms.

Figure 7:
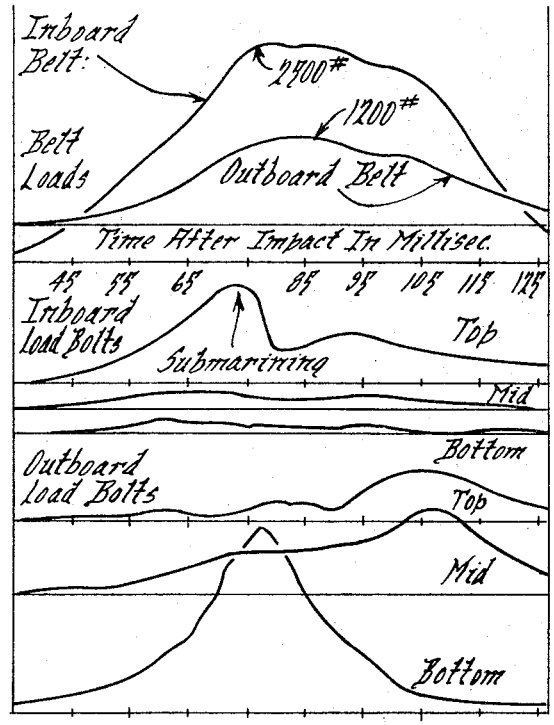

In FIG. 7 (test II), the conditions were the same as in the previous illustration except that the dummy did not submarine completely. The inboard belt road over the illiac crest at 76 ms as in the previous test. However, on the outboard side, the belt moved up only sufficiently to break contact with the bottom bolt at 78 ms. The center and top bolt load curves show a fall-off in the load as the belt load returns to zero. There is no abrupt change in slope which would indicate a sudden release in load. Also, there is no dip in the outboard belt curve. A comparative high speed film of the same crash effect did not evidence submarining on the inboard side. Therefor the utility of such precise testing equipment is underscored. In the film, the dummy returned to its seated position and the outboard belt appeared low and snug to the pelvis, as the load bolt curved indicated.

In FIG. 5 (test III) the shoulder harness 23 remained taut but the belt looseness was reduced to 1 inch. The traces are shown enlarged to more clearly show the abrupt change in the curves indicating submarining. The reaction of all bolts is evident from the illustration. The inboard belt end moved passed the bottom, center and top bolts at 76, 82 and 84 ms, respectively, and for the outboard side, at 91, 99 and 105 ms, respectively. Submarining was very evident from dummy position after crash.

Figure 8:
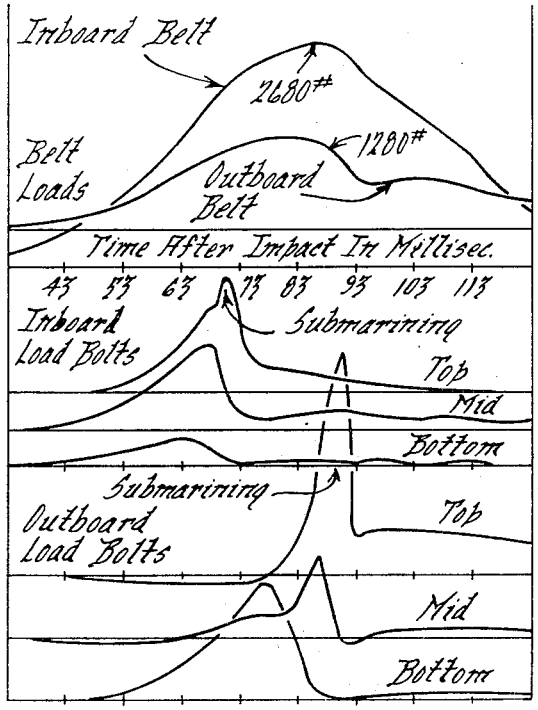

In FIG. 8 (test IV), the harness was loosened so that about 3/4 of an inch spacing would appear between the harness 23 and the dummy's chest 31. The lap belt 17 was pulled extra taut in an attempt to prevent the dummy from submarining. However, the results were the same as in the previous test. The dummy submarined and the upward travel of the belt is very evident from the load bolt traces. A comparative high speed film for this test did not show submarining, again pointing out the importance of this apparatus. The dummy ended up essentially in an upright position. Without the evidence gained from the load bolt traces, there would be a total error or a difference of opinion regarding submarining on the basis of the film alone.

Figure 9:
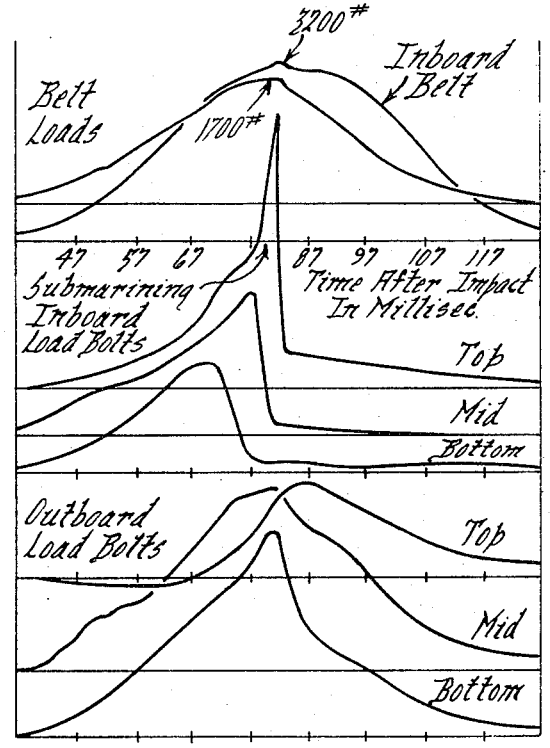

In FIG. 9 (test V), the harness was loosened to permit a five inch cube to be placed between the chest 31 and the harness 23. The lap belt was maintained taut. Even with this extreme harness slack, the lap belt quickly road up the inboard ilium and inboard submarining occurred. However, on the outboard side, the belt only broke contact with the bottom belt 14. Full submarining did not occur. A corresponding high speed film did show the belt moving back into position after the crash but did not make apparent what was happening during the crash. Therefor, it made conclusive that the use of the pelvic load bolts to indicate submarining was a feasible and very effective way to determine both submarining and the tendency to submarine.

I claim:

1. A test apparatus for indicating slippage under load of a restraining belt relative to an iliac-contoured surface of an anthropomorphic dummy and about which said belt surrounds, said apparatus comprising:
   a. means for decelerating said dummy along a path generally normal to the extent of said iliac-contoured surface,
   b. means securing opposed ends of said belt so that a plane containing the arcuately shaped belt passes through said surface with the belt in engagement with said surface to secure said dummy against deceleration, and
   c. means embedded in said iliac-contoured surface for continuously sensing the existence or non-existence of forces applied by said belt at specific elevations along said iliac-contoured surface.

2. A test apparatus as in claim 1, which further comprises means for continuously displaying the existence or non-existence of said sensed signal in accordance with time, a sharp drop in a sensed signal for any specific elevation indicating the degree of submarining of said dummy.

3. A test apparatus as in claim 1, in which the belt plane describes an angle with the horizontal of between 0° and 90°.

4. A test apparatus as in claim 1, in which said iliac-contoured surface is particularly defined by a compound curvature having a high peak and a lower, more recessed portion below the peak or crest, said resting on this surface below the crest, the non-existence of a force against said sensors indicating a degree of submarining whereby said belt has undergone slippage to engage said peaks or beyond.

5. A test apparatus as in claim 1, in which said restraining belt is of the lap type, the apparatus further comprising a shoulder harness to effective to apply a downward force component on the dummy during a crash.

6. A test apparatus as in claim 1, in which said sensors each comprise an electrical straingage having a pressure sensitive surface protruding beyond the iliac-contoured surface.

7. A test apparatus as in claim 1, in which there are a pair of iliac-contoured surfaces each having embedded therein a plurality of at least three sensors at independent elevations of said surface, said apparatus further comprising means for continuously displaying the signal from said sensors independently of each other whereby the existence or nonexistence of any one of said signals is capable of indicating both a skewed and/or a submarining position of said dummy.

* * * * *